United States Patent [19]

Lass

[11] Patent Number: 5,165,025
[45] Date of Patent: Nov. 17, 1992

[54] INTERLACING THE PATHS AFTER A CONDITIONAL BRANCH LIKE INSTRUCTION

[76] Inventor: Stanley E. Lass, 119 W. Maple St., Ogden, Iowa 50212

[21] Appl. No.: 711,496

[22] Filed: May 30, 1991

Related U.S. Application Data

[63] Continuation of Ser. No. 254,217, Oct. 6, 1988, abandoned.

[51] Int. Cl.⁵ ............................................. G06F 9/38
[52] U.S. Cl. ..................... 395/375; 364/DIG. 1; 364/231.8; 364/261.4; 364/261.5; 364/263; 364/263.1
[58] Field of Search .................. 364/200, 900; 395/375

[56] References Cited

U.S. PATENT DOCUMENTS

| | | | |
|---|---|---|---|
| 4,373,180 | 2/1983 | Linde | 364/200 |
| 4,439,827 | 3/1984 | Wilkes | 364/200 |
| 4,777,594 | 10/1988 | Jones et al. | 364/200 |
| 4,881,194 | 11/1989 | Sprague et al. | 364/900 |

OTHER PUBLICATIONS

Lilja, "Reducing the Branch Penalty in Pipelined Processors", IEEE Computer, vol. 21, No. 7, Jul. 1988 pp. 47-55.

Primary Examiner—Michael R. Fleming
Assistant Examiner—Debra A. Chun

[57] ABSTRACT

By interlacing the two program paths after the test part of a conditional branch, both program paths are available (with minimal delay) from a simple instruction fetch mechanism. Further, the interlacing of program paths continues only until one path ends with an unconditional branch or return.

6 Claims, 1 Drawing Sheet

|  TEST   | TRUE 1   |
|---------|----------|
| FALSE 1 | TRUE 2   |
| FALSE N | TRUE N+1 |

CONDITIONAL BRANCH LIKE TEST IN AN EVEN WORD

|         | TEST   |
|---------|--------|
| FALSE 1 | TRUE 1 |
| FALSE N | TRUE N |

CONDITIONAL BRANCH LIKE TEST IN AN ODD WORD

FIG. 1

| TEST | TRUE 1 |
| --- | --- |
| FALSE 1 | TRUE 2 |
| FALSE N | TRUE N+1 |

CONDITIONAL BRANCH LIKE TEST IN AN EVEN WORD

FIG. 2

|  | TEST |
| --- | --- |
| FALSE 1 | TRUE 1 |
| FALSE N | TRUE N |

CONDITIONAL BRANCH LIKE TEST IN AN ODD WORD

FIG. 3

| TEST | THEN |
| --- | --- |
| CONTINUE | THEN |
| CONTINUE | BRANCH |
| CONTINUE | CONTINUE |

AN IF-THEN-CONTINUE EXAMPLE

FIG. 4

| TEST | THEN |
| --- | --- |
| ELSE | THEN |
| ELSE | THEN |
| ELSE | CONTINUE |
| BRANCH | CONTINUE |
| CONTINUE | CONTINUE |

AN IF-THEN-ELSE-CONTINUE EXAMPLE

INTERLACING THE PATHS AFTER A CONDITIONAL BRANCH LIKE INSTRUCTION

This is a continuation of Ser. No. 254,217, filed Oct. 6, 1988, now abandoned.

BACKGROUND OF THE INVENTION

1. Field of the Invention

This invention relates in general to computers, and in particular to interlacing the paths after a conditional branch like instruction.

2. Prior Art

In a conventional computer, after a failed conditional branch, execution proceeds with the sequential instructions following the conditional branch instruction (the condition false path). After a successful conditional branch instruction, execution resumes with instructions fetched beginning at the branch target address (the condition true path).

The above is simple and direct for non-pipelined execution. However, there are delays in calculating (and/or obtaining) the conditional branch target address and in accessing memory for the instructions at the target address. Some techniques that have been used to minimize conditional branch delays are described next.

Branch target buffers have been used to minimize conditional branch delays. However, there is a delay associated with calculating the branch target address, then associating on the address and accessing the target instructions from the branch target buffer.

When the branch condition can be tested early, a delayed conditional branch can be performed such that the instruction fetch unit can get an early start on fetching the instructions to be executed next.

A "prepare to branch" instruction can provide the branch target address prior to the actual conditional branch instruction. This technique reduces code density.

The preceding approaches attempt to overcome the inherent difficulty of simultaneously fetching both program paths from two separate areas of memory. The present invention interlaces both program paths after a conditional branch like test and so avoids the difficulty.

Branch prediction has been used such that only the most likely to be executed path is fetched.

Early drum computers could switch drum tracks as the way of implementing conditional branches with minimum delay. However, the allocation of instructions to the drum memory tracks is difficult to do in an optimal fashion.

I believe the 360/65 micro-programming facility accessed two micro-instructions in parallel each clock. This allowed using a just computed test result to select one of the two micro-instructions just prior to executing the micro-instruction. This minimized the delay between the test result and proceeding with the computation. I believe that each micro-instruction had a next address field. For a general purpose computer instruction set, this technique would have a low code density.

Both of the above provide near immediate access to either of the two paths following a conditional branch like test.

For additional information, see the recent survey article, "Reducing the Branch Penalty in Pipelined Processors" by David Lilja in "Computer", July, 1988.

The object of the present invention is to minimize the delays due to conditional branch like tests.

SUMMARY OF THE INVENTION

Following a conditional branch like test in a program, the two program paths that follow the test are interlaced. By interlacing the two program paths, both program paths are available for execution with minimal delay. A double wide instruction fetch mechanism fetches both paths. The interlacing continues only until one path would end with the execution of an unconditional branch or a return, then the other path transitions to non-interlaced (sequential) execution.

Note that delayed unconditional branches and returns, if used, are one or more instructions upstream of the end of a path. As the computer executes an interlaced path, the computer monitors the other path such that it detects both the normal and delayed forms of the unconditional branch and return instructions, when the other path has ended, the computer then transitions to non-interlaced (sequential) instruction execution.

Unconditional branches can be to interlaced or non-interlaced (sequential) instructions. Following an unconditional branch to interlaced instructions, interlaced execution proceeds the same as for a conditional branch like test instruction. The other path is monitored for the end of the other interlaced path.

BRIEF DESCRIPTION OF THE DRAWINGS

FIGS. 1 and 2 show the interlacing of program paths after a conditional branch like test.

FIG. 3 shows an "if-then-continue" example.

FIG. 4 shows an "if-then-else-continue" example.

DETAILED DESCRIPTION

The instruction fetch mechanism fetches a pair of adjacent words in parallel, an even address word and the next higher address (odd) word. Sequential pairs of instruction words are fetched as needed until the address in the program counter is changed, e.g. by an unconditional branch, then fetching resumes by fetching instructions beginning at the new program counter address.

Normal sequential execution executes the instructions in the even address word first, then the odd address word.

The following describes the arrangement in storage of the two program paths following a conditional branch like test instruction. The two program paths that follow the condition test are interlaced until one path ends with a branch of some kind, e.g. an unconditional branch or a return instruction. The interlaced part of the condition false path is in the even address words following the condition test and the interlaced part of the condition true path is in the odd address words following the condition test. After one path ends, e.g. with an unconditional branch, the instruction words in the other path are stored sequentially until the next conditional branch like test instruction or until the path ends.

As part of executing a conditional branch like test, both paths are fetched as a part of normal instruction fetching. The condition test selects one of the two interlaced paths as the source of instructions to be executed. For a condition true, execution proceeds with the next odd address words. For a condition false, execution proceeds with the next even address words. See FIGS. 1 and 2.

The interlaced execution continues until one path ends with a branch other than a call, e.g. an unconditional branch or a return. The branch can be in either the path executing or the other path. If the branch is in the other path, execution then transitions to non-interlaced (sequential) execution.

A delayed branch instruction executes one or more of the instructions following the branch before executing instructions fetched from the branch's target address. By executing one or more instructions after a branch, some or all of the delay due to branching can be masked.

Note that delayed branches (including delayed unconditional branches and returns), if used, are one or more instructions upstream of the end of a path. As the computer executes an interlaced path, the computer monitors the other path such that it detects both the normal and delayed forms of branch instructions, if the other path ends, the computer then transitions to non-interlaced (sequential) execution.

When there aren't enough instructions prior to an unconditional branch such that a delayed branch can be used to mask the branch delay, the technique of moving or copying instructions from the branch target to after the delayed branch instruction can be easily applied and helps minimize the unconditional branch delays. If used, the branch target address must be adjusted accordingly.

To provide flexibility, the unconditional branch opcodes specify whether a branch is to interlaced or non-interlaced instructions. As part of the execution of an unconditional branch to interlaced instructions, a branch to an odd address is treated as though a conditional branch like test instruction had a true outcome and a branch to an even address is treated as though a conditional branch like test instruction had a false outcome, i.e. the source of instructions is from odd or even words. The monitoring for the end of the other path is the same as for the conditional branch like test instruction.

However, care must be taken to branch such that if the other path ends, the ending is properly picked up. An example of confusion is a branch to interlaced instructions words wherein the adjacent word (of a pair of instruction words) follows a delayed branch and contains the last instruction in the path. Since the branch is to after the preceding delayed branch in the other path, the computer misses the end of the other path. The remedy is for the compiler not to use a delayed branch in this context. See FIGS. 3 and 4 for example uses of a branch to interlaced instruction words.

Condition test instructions are disallowed in interlaced instruction words except within the last interlaced instruction pair. This rule avoids any nesting of interlacing. As the interlacing of the prior condition test instruction ends, the interlacing of a new condition test instruction may begin.

A less restrictive alternative to the above rule is to combine the condition test instruction and an unconditional branch instruction such that the interlaced instructions for the condition test instruction begin at the branch target address of the unconditional branch.

By always putting the condition true path in odd address words and the condition false path in even address words, the condition test outcome can be directly applied to a multiplexer to select the next instruction words for execution. This minimizes the number of logic levels required.

An alternative or adjunct to watching for a branch in the other path is to encode the length of interlaced execution into the condition test instruction and into unconditional branches to to interlaced instructions. Use of this approach would allow the interlaced execution in both paths to end without a branch in either path, e.g. a use would be for equal length paths in an "if-then-else" construct. Another use would be to avoid the possibility of missing delayed branches in the other path.

Note that even and odd address words need not contain exactly one instruction. The words just hold the instruction stream.

Many modifications and variations of the present invention are possible in light of the above teachings. It is therefore to be understood that within the scope of the appended claims, the invention may be practised otherwise than specifically described.

I claim:

1. An improved instruction supplying mechanism for use in a high speed computer which
   includes a double word instruction fetch mechanism,
   supplies instructions sequentially, and
   accepts new addresses into the program counter,
   wherein the improvement for reducing conditional branch delays comprises:
      means to supply instructions from the odd address words in fetched double words in response to a condition true from a conditional branch like test, and
      means to supply instructions from the even address words in fetched double words in response to a condition false from a conditional branch like test,
   whereby a simple double word instruction fetch mechanism provides both paths after a conditional branch like test instruction and conventional unconditional branch and return instructions provide means to exit from interlaced execution.

2. The improved instruction supplying mechanism of claim 1 further including means to detect during interlaced execution the end of interlacing and transition to sequential supplying of instructions, said means to detect is by detecting unconditional branch and return instructions in the not executing path.

3. The improved instruction supplying mechanism of claim 1 further including means to detect during interlaced execution the end of interlacing and transition to sequential supplying of instructions, said means to detect uses an encoded length of interlacing in condition test instructions.

4. An improved instruction supplying mechanism for use in a high speed computer which
   includes a double word instruction fetch mechanism,
   supplies instructions sequentially, and
   accepts new addresses into the program counter,
   wherein the improvement for reducing conditional branch delays and minimizing replication of instructions comprises:
      means to supply instructions from the odd address words in fetched double words in response to a condition true from a conditional branch like test and in response to an unconditional branch to interlaced instructions in which the branch target address is odd, and
      means to supply instructions from the even address words in fetched double words in response to a condition false from a conditional branch like test and in response to an unconditional branch to interlaced instructions in which the branch target address is even, whereby a simple double word instruction fetch mechanism provides both paths after a conditional branch like test instruction and conventional unconditional branch and return instructions provide means to exit from interlaced execution.

5. The improved instruction supplying mechanism of claim 4 further including means to detect during interlaced execution the end of interlacing and transition to sequential supplying of instructions, said means to detect is by detecting unconditional branch and return instructions in the not executing path.

6. The improved instruction supplying mechanism of claim 4 further including means to detect during interlaced execution the end of interlacing and transition to sequential supplying of instructions, said means to detect uses an encoded length of interlacing in the instructions for condition test and in unconditional branch to interlaced instructions.

* * * * *